US012561073B2

(12) United States Patent
Deng et al.

(10) Patent No.: US 12,561,073 B2
(45) Date of Patent: Feb. 24, 2026

(54) OPERATION METHOD OF MEMORY DEVICE, MEMORY DEVICE, AND MEMORY SYSTEM

(71) Applicant: YANGTZE MEMORY TECHNOLOGIES CO., LTD., Wuhan (CN)

(72) Inventors: Zihao Deng, Wuhan (CN); Ling Chu, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/967,363

(22) Filed: Dec. 3, 2024

(65) Prior Publication Data

US 2025/0278201 A1     Sep. 4, 2025

(30) Foreign Application Priority Data

Feb. 29, 2024    (CN) .......................... 202410234255.8

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)

(58) Field of Classification Search
CPC ..... G06F 3/0619; G06F 3/0653; G06F 3/0679
See application file for complete search history.

(56) References Cited

U.S. PATENT DOCUMENTS

| | | | |
|---|---|---|---|
| 2024/0161836 A1* | 5/2024 | Doru .................... | G06F 12/0246 |
| 2024/0395344 A1* | 11/2024 | Ramanan ........... | G11C 16/0483 |
| 2025/0218521 A1* | 7/2025 | Ahn .................... | G11C 11/5635 |

* cited by examiner

*Primary Examiner* — Francisco A Grullon
(74) *Attorney, Agent, or Firm* — Conley Rose, P.C.

(57) ABSTRACT

An operation method of a memory device includes: when a program temperature of a memory device is less than a temperature threshold, and during a process of programming a selected memory cell coupled with a first selected word line, applying a first program voltage to the first selected word line, applying a first pass voltage to a first target word line, and applying a second pass voltage to a second target word line, wherein the first selected word line is any one of lines of the memory device that is selected after a reference word line, the first pass voltage is greater than a third pass voltage, and the third pass voltage is a voltage that is utilized to turn on a channel of a memory cell coupled with the first target word line.

20 Claims, 8 Drawing Sheets

100

100

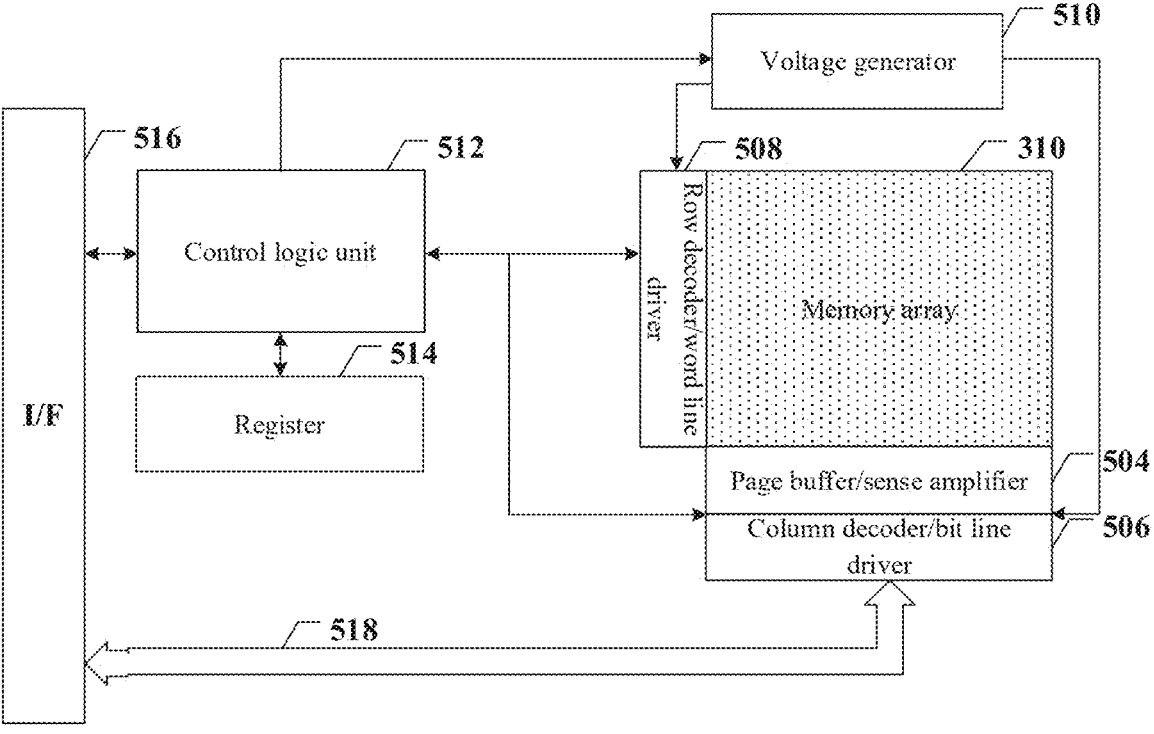

Fig. 5

During a process of programming a selected memory cell coupled with a first selected word line, a first program voltage is applied to the first selected word line, a first pass voltage is applied to a first target word line, and a second pass voltage is applied to a second target word line, wherein the first selected word line is any one of a plurality of word lines of the memory that is selected after a reference word line, the first pass voltage is greater than a third pass voltage, and the third pass voltage is a voltage that is utilized to turn on a channel of a memory cell coupled with the first target word line

Memory system

OPERATION METHOD OF MEMORY DEVICE, MEMORY DEVICE, AND MEMORY SYSTEM

CROSS-REFERENCE TO RELATED APPLICATIONS

This application claims the benefit of priority to China Patent Application No. CN 2024102342558, filed on Feb. 29, 2024, which is incorporated herein by reference in its entirety.

TECHNICAL FIELD

The present disclosure relates to the technical field of memory devices, and particularly to an operation method of a memory device, a memory device, and a memory system.

BACKGROUND

The memory device supports a variety of operations, such as a program operation, an erase operation, a read operation, etc. During a program operation process of the memory device, each word line in the memory device is selected in sequence according to a program direction, and the selected memory cell coupled with the selected word line is programmed by applying a program voltage to the selected word line.

SUMMARY

Examples of the present disclosure provide an operation method of a memory device, a memory device, and a memory system. The technical solutions are as follows:

In an aspect, examples of the present disclosure provide an operation method of a memory device. A program temperature of a memory device is less than a temperature threshold. The method comprises:

during a process of programming a selected memory cell coupled with a first selected word line, applying a first program voltage to the first selected word line, applying a first pass voltage to a first target word line, and applying a second pass voltage to a second target word line, wherein the first selected word line is any one of a plurality of word lines of the memory device that is selected after a reference word line, the number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

In one possible implementation, the method further comprises:

acquiring a compensation voltage, wherein the compensation voltage is determined based on a correspondence relationship between the program temperature and the compensation voltage, as well as the program temperature of the memory device; and using a sum of the compensation voltage and the third pass voltage as the first pass voltage.

In one possible implementation, the compensation voltage is negatively correlated with the program temperature of the memory device.

In one possible implementation, the compensation voltage is positively correlated with a sequence in which the first selected word line is selected.

In one possible implementation, the first target word line comprises a first neighboring word line and a second neighboring word line, and a voltage difference value corresponding to the first neighboring word line is less than a voltage difference value corresponding to the second neighboring word line. The voltage difference value corresponding to the first neighboring word line is a difference value between a first pass voltage applied to the first neighboring word line and a third pass voltage that is utilized to turn on a channel of a memory cell coupled to the first neighboring word line, and the voltage difference value corresponding to the second neighboring word line is a difference value between a first pass voltage applied to the second neighboring word line and a third pass voltage that is utilized to turn on a channel of a memory cell coupled to the second neighboring word line. A selected memory cell coupled with the first neighboring word line has been programmed, and a selected memory cell coupled with the second neighboring word line is not programmed.

In one possible implementation, the method further comprises:

during a process of programming a selected memory cell coupled with a second selected word line, applying a second program voltage to the second selected word line, applying a fourth pass voltage to a third target word line, and applying a fifth pass voltage to a fourth target word line, wherein the second selected word line is any one of the reference word line and a word line among the plurality of word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled to the third target word line, and a difference value between the fourth pass voltage and the sixth pass voltage is less than a difference value between the first pass voltage and the third pass voltage.

In one possible implementation, the program temperature of the memory device being less than the temperature threshold comprises: during the process of programming the memory device, a temperature measured by a temperature sensor in the memory device is less than the temperature threshold.

In another aspect, examples of the present disclosure provide a memory device. The memory device comprises:

a memory array comprising a plurality of memory cells;

a plurality of word lines coupled with the plurality of memory cells; and a peripheral circuit, coupled with the plurality of word lines, wherein the peripheral circuit is configured to execute the following operations when a program temperature of the memory device is less than a temperature threshold:

during a process of programming a selected memory cell coupled with a first selected word line, applying a first program voltage to the first selected word line, applying a first pass voltage to a first target word line, and applying a second pass voltage to a second target word line, wherein the first selected word line is any one of a plurality of word lines of the memory device that is selected after a reference word line, the number of the word lines spaced between the first target word line and first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

In one possible implementation, the memory device further comprises a temperature sensor. The peripheral circuit is configured to measure, by the temperature sensor, the program temperature of the memory device.

In one possible implementation, the peripheral circuit is further configured to:

acquire a compensation voltage, wherein the compensation voltage is determined based on a correspondence relationship between the program temperature and the compensation voltage, as well as the program temperature of the memory device; and use a sum of the compensation voltage and the third pass voltage as the first pass voltage.

In one possible implementation, the compensation voltage is negatively correlated with the program temperature of the memory device.

In one possible implementation, the compensation voltage is positively correlated with a sequence in which the first selected word line is selected in a program direction.

In one possible implementation, the first target word line comprises a first neighboring word line and a second neighboring word line, and a voltage difference value corresponding to the first neighboring word line is less than a voltage difference value corresponding to the second neighboring word line. The voltage difference value corresponding to the first neighboring word line is a difference value between a first pass voltage applied to the first neighboring word line and a third pass voltage that is utilized to turn on a channel of a memory cell coupled to the first neighboring word line, and the voltage difference value corresponding to the second neighboring word line is a difference value between a first pass voltage applied to the second neighboring word line and a third pass voltage that is utilized to turn on a channel of a memory cell coupled to the second neighboring word line. A selected memory cell coupled with the first neighboring word line has been programmed, and a selected memory cell coupled with the second neighboring word line is not programmed.

In one possible implementation, the peripheral circuit is further configured to:

during a process of programming a selected memory cell coupled with a second selected word line, apply a second program voltage to the second selected word line, apply a fourth pass voltage to a third target word line, and apply a fifth pass voltage to a fourth target word line, wherein the second selected word line is any one of the reference word line and a word line among the plurality of word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled to the third target word line, and a difference value between the fourth pass voltage and the sixth pass voltage is less than a difference value between the first pass voltage and the third pass voltage.

In another aspect, examples of the present disclosure provide a memory system. The memory system comprises a memory device and a controller coupled with the memory device. The controller is configured to control the memory device. The memory device is configured to execute the following operations when a program temperature of the memory device is less than a temperature threshold:

during a process of programming a selected memory cell coupled with a first selected word line, applying a first program voltage to the first selected word line, applying a first pass voltage to a first target word line, and applying a second pass voltage to a second target word line, wherein the first selected word line is any one of a plurality of word lines of the memory device that is selected after a reference word line, the number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

In one possible implementation, the memory device is further configured to:

acquire a compensation voltage, wherein the compensation voltage is determined based on a correspondence relationship between the program temperature and the compensation voltage, as well as the program temperature of the memory device; and use a sum of the compensation voltage and the third pass voltage as the first pass voltage.

In one possible implementation, the controller stores the correspondence relationship between the program temperature and the compensation voltage; the controller is configured to send the correspondence relationship to the memory device; and the memory device is configured to receive the correspondence relationship, and determine the compensation voltage based on the correspondence relationship, and the program temperature of the memory device.

In one possible implementation, the controller stores the correspondence relationship between the program temperature and the compensation voltage; the memory device is configured to send, to the controller, the program temperature of the memory device;

the controller is configured to receive the program temperature of the memory device, determine the compensation voltage based on the correspondence relationship, and the program temperature of the memory device, and send the compensation voltage to the memory device; and the memory device is further configured to receive the compensation voltage.

In one possible implementation, the memory device stores the correspondence relationship between the program temperature and the compensation voltage. The memory device is configured to determine the compensation voltage based on the correspondence relationship, and the program temperature of the memory device.

In one possible implementation, the memory device is further configured to:

during a process of programming a selected memory cell coupled with a second selected word line, apply a second program voltage to the second selected word line, apply a fourth pass voltage to a third target word line, and apply a fifth pass voltage to a fourth target word line, wherein the second selected word line is any one of the reference word line and a word line among the plurality of word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled to the third target word line, and a difference value between the fourth pass voltage and the sixth pass voltage is less than a difference value between the first pass voltage and the third pass voltage.

BRIEF DESCRIPTION OF THE DRAWINGS

FIG. 5 is a schematic structural diagram of a peripheral circuit provided by examples of the present disclosure;

FIG. 6 is a flow diagram of an operation method of a memory device provided by examples of the present disclosure;

DETAILED DESCRIPTION

Figure 1:
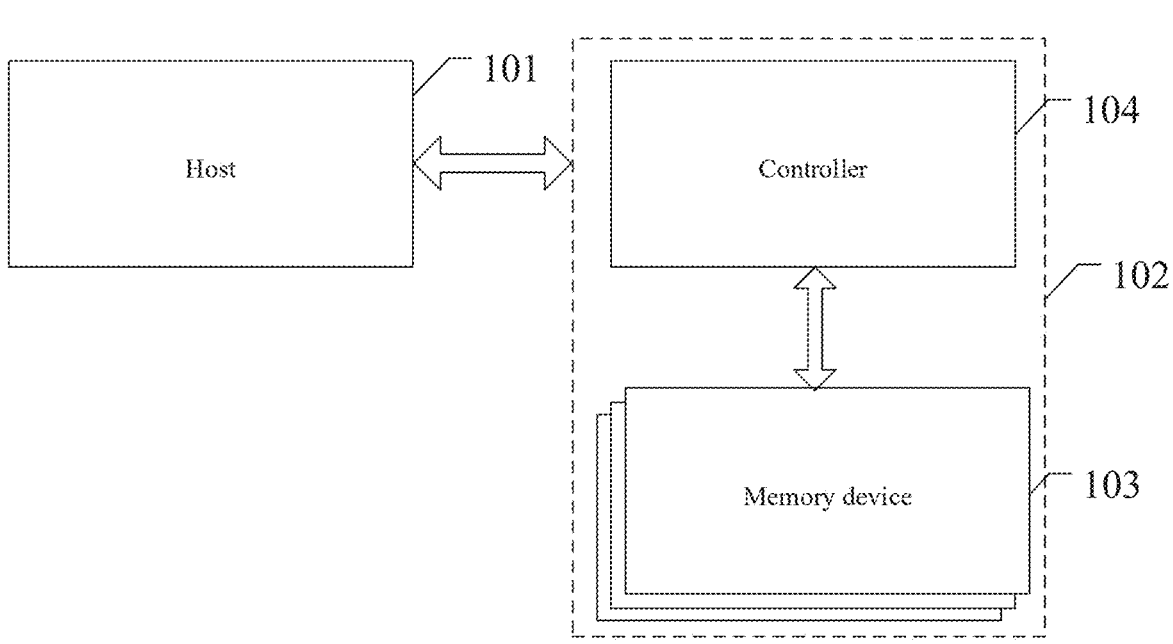
FIG. 1 is a schematic structural diagram of an electronic system provided by examples of the present disclosure.

In order to make objectives, technical solutions, and advantages of the present disclosure clearer, the implementations of the present disclosure will be described in detail below with reference to the drawings. Although example implementations of the present disclosure are shown in the drawings, it is to be understood that, the present disclosure may be implemented by various forms without being limited by the implementations as set forth herein. On the contrary, these implementations are provided for more thorough understanding of the present disclosure, and to fully convey the scope of the present disclosure to a person skilled in the art. All the drawings are in a very simple form and in an inaccurate proportion, and are merely intended to assist description of the purpose of the examples of the present disclosure conveniently and clearly.

It is to be noted that terms "first", "second" and the like in the present disclosure are used for distinguishing similar objects rather than describing a specific sequence or a precedence order. It should be understood that the data used in such a way may be exchanged where appropriate, in order that the examples of the present disclosure described here can be implemented in an order other than those illustrated or described herein. The implementations described in the following example implementations do not represent all implementations consistent with the present disclosure. On the contrary, the implementations are merely examples consistent with some aspects of the present disclosure.

It should be readily understood that the meaning of "on", "above", and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (e.g., directly on something).

Further, spatially relative terms such as "beneath," "below," "lower," "above," "upper" and the like, may be used herein for ease of description to describe the relationship of one element or feature to (one or more) other element or feature as shown in the figures. The spatially relative terms are intended to cover different orientations in the use or operation of the device other than those depicted in the figures. The device can be oriented in other ways (rotated 90 degrees or in other orientations) and the spatially relative descriptors used herein can be interpreted accordingly.

FIG. 1 shows a schematic structural diagram of an electronic system provided by examples of the present disclosure. The electronic system 100 may comprise a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memory devices.

As shown in FIG. 1, the electronic system 100 comprises a host 101 and a memory system 102 coupled to the host 101. The host 101 may be a processor of an electronic apparatus (such as a central processing unit (CPU), or a system on chip (SoC) (such as an application processor (AP)). The host 101 may be configured to send data to the memory system 102. Alternatively, the host 101 may be configured to receive the data from the memory system 102.

The memory system 102 comprises one or more memory devices 103 and a controller 104. The controller 104 is coupled to the memory device 103, and the controller 104 is configured to control the memory device 103. The memory device 103 may be any type of memory. In an example, the memory device 103 is a Not AND (NAND) flash memory, such as a 3D NAND flash memory. Alternatively, the memory device 103 is a dynamic random-access memory (DRAM), etc.

In some examples, the controller 104 is further coupled to the host 101. The controller 104 may manage data stored in the memory device 103, and communicate with the host 101.

In one possible implementation, the controller 104 is designed for operating in a low duty-cycle environment, such as secure digital (SD) cards, compact flash (CF) cards, universal serial bus (USB) flash drives, or other media for use in electronic apparatuses, such as personal computers, digital cameras, mobile phones, etc.

In one possible implementation, the controller 104 is designed for operating in a high duty-cycle environment, for example, such as solid-state drives or embedded multi-media cards (eMMCs). The SSD or the eMMC serves as a data memory for a mobile apparatus, such as a smart phone, a tablet computer, and a laptop computer, etc., and an enterprise memory array.

The controller 104 may further be configured to control operations of the memory device 103, such as read, erase, and program operations. The controller 104 may further be configured to manage various functions with respect to data stored or to be stored in the memory device 103, including, but not limited to, bad-block management, garbage collection, logical-to-physical address translation, wear leveling, etc. In one possible implementation, the controller 104 is further configured to process error correction codes (ECC) with respect to the data read from or written to the memory device 103.

The controller 104 may further execute any other suitable functions, for example, formatting the memory device 103. The controller 104 may communicate with an external apparatus (e.g., the host 101) according to a communication protocol. For example, the controller 104 may communicate with the external apparatus through at least one of various interface protocols, such as a USB protocol, a multimedia card (MMC) protocol, a peripheral component interconnection (PCI) protocol, a PCI-Express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, a non-volatile memory express (NVMe) protocol, etc.

The controller 104 and the one or more memory devices 103 may be integrated into various types of memory systems 102, for example, be comprised in the same package (such as a universal flash storage (UFS) package or an eMMC package). That is to say, the memory system 102 may be implemented and packaged into different types of end electronic products.

Figure 2:
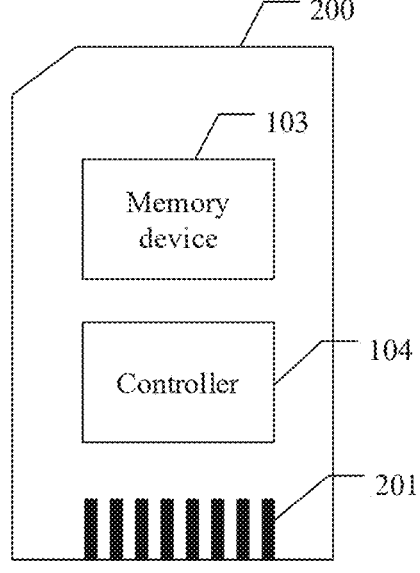
FIG. 2 is a schematic structural diagram of a memory card provided by examples of the present disclosure.

In an example, as shown in FIG. 2, the controller 104 and the single memory device 103 may be integrated into a memory card 200. The memory card 200 may comprise a personal computer memory card international association (PCMCIA) card (PC) card, a CF card, a smart media (SM) card, a memory stick, a multimedia card (MMC, reduced-size (RS)-MMC, MMCmicro), an SD card (SD, miniSD, microSD, secure digital high capacity (SDHC) card), a UFS, etc. The memory card 200 may further comprise a memory card connector 201 coupling the memory card 200 with a host (e.g., the host 101 in FIG. 1).

Figure 3:
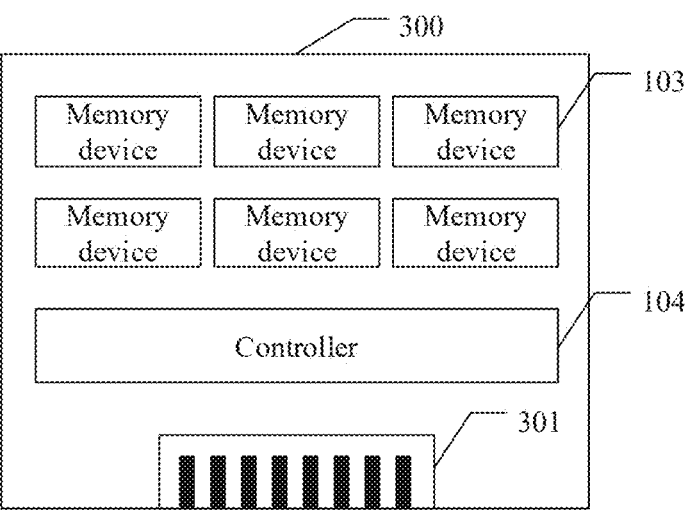
FIG. 3 is a schematic structural diagram of a solid-state disk provided by examples of the present disclosure.

In an example, as shown in FIG. 3, the controller 104 and the plurality of memory devices 103 may be integrated into a solid-state disk (which may also be referred to as a solid-state drive) 300. The solid-state disk 300 may further comprise a solid-state disk connector 301 coupling the solid-state disk 300 with a host (e.g., the host 101 in FIG. 1). In one possible implementation, at least one of a storage capacity or an operation speed of the solid-state disk 300 is greater than at least one of a storage capacity and/or an operation speed of the memory card 200.

Figure 4:
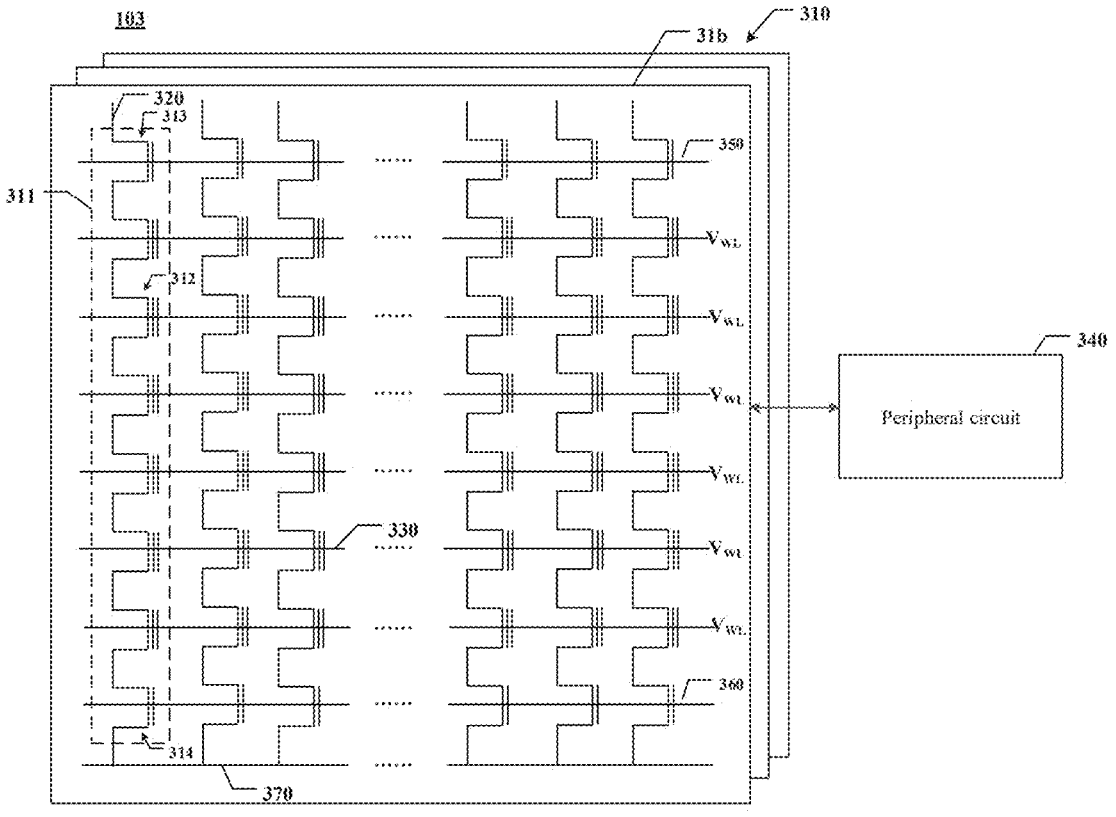
FIG. 4 is a schematic structural diagram of a memory device provided by examples of the present disclosure.

FIG. 4 is a schematic diagram of a memory provided by examples of the present disclosure. As shown in FIG. 4, a memory device 103 comprises a memory array 310, a plurality of word lines (WL) 330, and a peripheral circuit 340. The memory array 310 comprises a plurality of memory cells 312; the plurality of word lines 330 are coupled with the plurality of memory cells 312; and the peripheral circuit 340 is coupled with the plurality of word lines 330.

The memory array 310 comprises a plurality of memory strings 311. The plurality of memory strings 311 are arranged in the form of an array, are located on a bearing side of a substrate (not shown), and extend in a direction perpendicular to a bearing surface of the substrate. In an example, the bearing surface of the substrate refers to a surface of the substrate that is used for bearing the memory array 310.

Each memory string 311 comprises the plurality of memory cells 312, and the plurality of memory cells 312 in each memory string 311 are stacked in the direction perpendicular to the bearing surface of the substrate. Each memory cell 312 has a function of storing data, the stored data is determined by the number of electrons stored in the memory cell 312, and the number of electrons stored in the memory cell 312 can determine a threshold voltage of the memory cell 312, such that the threshold voltage of the memory cell 312 can indicate the data stored in the memory cell. The memory cell 312 is a floating gate field-effect transistor or a charge trap-type field-effect transistor.

In an example, the memory cell 312 may be a single level cell (SLC), a multi-level cell (MLC), a triple level cell (TLC), a quad level cell (QLC), or the like. The SLC, the MLC, the TLC, and the QLC can respectively store 1-bit, 2-bit, 3-bit, and 4-bit data.

Each memory string 311 further comprises a top select transistor 313 and a bottom select transistor 314; and the top select transistors 313 in different memory strings 311 at a same height or similar height from the bearing surface of the substrate are coupled to a same drain select line (DSL) 350. The bottom select transistors 314 in different memory strings 311 at a same height or similar height from the bearing surface of the substrate are coupled to a same source select line (SSL) 360. The top select transistor 313 and the bottom select transistor 314 are configured to activate the selected memory string when the memory cell is read, programmed, or erased. The top select transistor 313 is also referred to as a top select gate (TSG), and the bottom select transistor 314 is also referred to as a bottom select gate (BSG). In some examples, dummy cells (DC) also exist between the top select transistor 313 and the memory cell 312, and between the bottom select transistor 314 and the memory cell 312.

One end of the memory string 311 is coupled to a bit line (BL) 320, and the other end of the memory string 311 is coupled to a source line (SL) 370.

The memory cells 312 in different memory strings 311 at the same height or similar height from the bearing surface of the substrate are at a same layer, and the plurality of memory cells 312 at the same layer constitute one memory cell layer, e.g., the memory array 310 comprises a plurality of memory cell layers, and the plurality of word lines 330 are respectively coupled to the plurality of memory cell layers. All the memory strings 311 in the memory array 310 that share the same group of word lines constitute one block 31*b*. In some examples, source ends of the memory strings 311 in the same block 31*b* are all coupled to the same source line 370, and the source line 370 is also referred to as a common source line (CSL). For example, all the memory strings 311 in the same block 31*b* have array common sources (ACS). The source end of the memory string 311 refers to the end of the memory string 311 that is used to be coupled with the source line 370.

The peripheral circuit 340 may be coupled to the memory array 310 through the drain select line 350, the source select line 360, the bit lines 320, the source line 370, and the word lines 330. The peripheral circuit 340 may comprise any suitable analog, digital, and hybrid signal circuits for promoting operations of the memory array 310 by applying and sensing voltage signals and/or current signals to and from the memory cell 312 via the drain select line 350, the source select line 360, the bit lines 320, the source line 370, and the word lines 330.

The peripheral circuit 340 may comprise various types of peripheral circuits formed using a metal-oxide-semiconductor (MOS) technology. The peripheral circuit 340 can control the memory cell in the selected memory string by controlling a voltage VWL of the word line 330 coupled with the selected memory string and a voltage VBL of the bit line coupled with the selected memory string, so as to achieve erase, program (also referred to as write), read, verify, etc. operations. In an example, the peripheral circuit 340 may be configured to execute an operation method of a memory provided by the examples of the present disclosure.

In an example, FIG. 5 shows an example structure of the peripheral circuit 340. The peripheral circuit 340 comprises a page buffer/sense amplifier 504, a column decoder/bit line (BL) driver 506, a row decoder/word line (WL) driver 508, a voltage generator 510, a control logic unit 512, a register 514, an interface 516, and a data bus 518. It is to be understood that, in some examples, the peripheral circuit 340 may further comprise additional components not shown in FIG. 5.

The page buffer/sense amplifier 504 may be configured to read and program (write) data from and to the memory array 310 according to a control signal from the control logic unit 512. In one example, the page buffer/sense amplifier 504 may store program data (write data) to be programmed into the memory array 310. In another example, the page buffer/sense amplifier 504 may execute a program verification operation to ensure that the data has been properly programmed into the memory cell 312 coupled to the selected word line 330. In yet another example, the page buffer/sense amplifier 504 may also sense a low power signal from the bit line 320 that represents a data bit stored in the memory cell 312, and amplifies a small voltage swing to a recognizable logic level in the read operation.

The column decoder/bit line driver 506 may be configured to be controlled by the control logic unit 512, and select one or more memory strings 311 by applying a bit line voltage generated from the voltage generator 510.

The row decoder/word line driver 508 may be configured to be controlled by the control logic unit 512, and select/unselect the word lines 330 of the blocks 31*b* of the memory array 310. The row decoder/word line driver 508 may further be configured to drive the word lines 330 using a word line voltage (VWL) generated from the voltage generator 510. In some implementations, the row decoder/word line driver 508 may also select/unselect and drive the drain select line 350 and the source select line 360.

The voltage generator 510 may be configured to be controlled by the control logic unit 512, and generate the word line voltage (such as, a read voltage, a program voltage, a pass voltage, a local voltage, a verify voltage, etc.), the bit line voltage, and a source line voltage, which are to be supplied to the memory array 310.

The control logic unit 512 may be coupled to each peripheral circuit component described above and configured to control operations of each peripheral circuit component.

The register 514 may be coupled to the control logic unit 512 and comprise a state register, a command register, and an address register for storing state information, a command operation code (OP code), and a command address for controlling the operations of each peripheral circuit component.

The interface 516 may be coupled to the control logic unit 512, and act as a control buffer to buffer and relay control commands received from a host (not shown) to the control logic unit 512 and state information received from the control logic unit 512 to the host. The interface 516 may also be coupled to the column decoder/bit line driver 506 via the data bus 518 and act as a data I/O interface and a data buffer to buffer and relay the data to and from the memory array 310.

The operation method of a memory device provided by the present disclosure refers to a program operation method of a memory device. During a program operation process of the memory device, each word line in the memory device is selected in sequence according to a program direction, and the selected memory cell is programmed by applying a program voltage to the selected word line. The selected word line refers to the word line that is selected. The selected memory cell refers to the memory cell that needs to be programmed among all the memory cells coupled to the selected word line.

It is to be noted that, among all the memory cells coupled with the selected word line there may be memory cells that do not need to be programmed; and in the examples of the present disclosure, the memory cells, which do not need to be programed, among all the memory cells coupled with the selected word line are referred to as non-selected memory cells coupled with the selected word line. Furthermore, in addition to the non-selected memory cells coupled with the selected word line, the memory cells in the memory device further comprise non-selected memory cells coupled with non-selected word lines. The non-selected memory cells coupled with non-selected word lines refer to the memory cells, which are located in the selected memory string, among all the memory cells coupled with the non-selected word lines; and the selected memory string refers to the memory string in which the selected memory cell is located.

During a process of programming the selected word line, the program voltage applied to the selected word line may make electrons enter electron storage layers (floating gates or charge trap layers) of the non-selected memory cells coupled with the selected word line, causing program interference to the non-selected memory cells coupled with the selected word line, that is, the non-selected memory cells coupled with the selected word line are also programmed. Since the non-selected memory cells coupled with the selected word line do not need to be programmed, if the non-selected memory cells coupled with the selected word line are also programmed, read errors are caused.

Generally, while the program voltage is applied to the selected word line, a pass voltage that is used for turning on a channel of the memory cell coupled with the non-selected word line is also applied to the non-selected word line, so as to increase potential of channels of the non-selected memory cells coupled with the selected word line through the applied pass voltage. By increasing the potential of the channels of the non-selected memory cells coupled with the selected word line, the possibility that the electrons enter the electron storage layers of the non-selected memory cells coupled with the selected word line due to the program voltage applied to the selected word line can be reduced, such that the program interference to the non-selected memory cells coupled with the selected word line can be properly reduced (or referring to as suppressed).

When a program temperature is relatively high, the program interference to the non-selected memory cells coupled with the selected word line is relatively small, and the small program interference can be effectively suppressed by applying the pass voltage that is used for turning on the channel of the memory cell coupled with the non-selected word line to the non-selected word line, such that produced read errors are negligible. However, when the program temperature is relatively low, due to reasons of a slow electron flow rate and the like, it is relatively difficult to program, such that during the process of programming the selected word line, a larger voltage is usually applied to the selected word line, the larger program voltage tends to produce greater program interference with a non-selected memory cell coupled with the selected word line, and it is difficult to effectively suppress the greater program interference by applying the pass voltage that is used for turning on the channel of the memory cell coupled with the non-selected word line to the non-selected word line, thereby causing the non-selected memory cell coupled with the selected word line to have a greater probability of being incorrectly programmed, increasing the read errors. Based on this, examples of the present disclosure provide an operation method of a memory device. The operation method of a memory device can reduce the read errors when the program temperature is relatively low.

The operation method of a memory device provided by the examples of the present disclosure is explained and described below. FIG. 6 is a flow diagram of an operation method of a memory device provided by examples of the present disclosure. The method may be applied to a peripheral circuit of the memory device. In an example, the method may be applied to a control logic unit in the peripheral circuit, and subsequent examples are explained and described by using the peripheral circuit as a performing subject.

The operation method of a memory device provided by the examples of the present disclosure is suitable for the case that a program temperature of a memory device is less than a temperature threshold.

The program temperature of the memory device refers to an environment temperature when memory cells in the memory device are programmed. In some examples, the memory device comprises a temperature sensor for measuring the environment temperature, and the peripheral circuit of the memory device measures, through the temperature sensor, the program temperature of the memory device. That is to say, the program temperature of the memory device being less than the temperature threshold means that, during the process of programming the memory device, a temperature measured by the temperature sensor in the memory device is less than the temperature threshold. The temperature sensor may be any one of sensors that can measure temperatures, and a type of the temperature sensor in the memory device is not limited in the examples of the present disclosure.

The temperature threshold is a preset numerical value that is used for measuring whether the program temperature of the memory device is a relatively-low temperature. That is to say, when the program temperature of the memory device is less than the temperature threshold, it is considered that the program temperature of the memory device is a relatively-low temperature; and when the program temperature of the memory device is not less than (e.g., greater than or equal to) the temperature threshold, it is considered that the program temperature of the memory device is a relatively-high temperature. In some examples, the temperature threshold may further be understood as a maximum program temperature that is non-negligible to read errors brought by performing programming using a program method of applying, to a non-selected word line, a pass voltage that is used for turning on a channel of a memory cell coupled with the non-selected word line, or may also be understood as the maximum program temperature triggering the operation method of a memory device provided by the examples of the present disclosure.

The temperature threshold may be set according to experience, or may be determined according to experimental tests. For example, by employing the operation method of applying, to the non-selected word line, the pass voltage that is used for turning on the channel of the memory cell coupled with the non-selected word line, a read window at a plurality of temperatures is measured, and the temperature at which the read window is less than a read window threshold is used as the temperature threshold; alternatively, the temperature at which a reduction degree of a read window at a relative reference temperature (a high temperature set according to experience, such as 85° C. (centigrade)) exceeds a degree threshold is used as the temperature threshold. The read window threshold and the degree threshold both may be thresholds set according to experience. The read window refers to a distance between distribution ranges of threshold voltages in two adjacent programmed states, e.g., a distance between a right boundary of the left programmed state and a left boundary of the right programmed state in the two adjacent programmed states; and if the read window between the two adjacent programmed states is larger, subsequent read data is more favorable, e.g., the read errors are fewer. It is to be noted that, the read window at any temperature may refer to a read window that is determined according to a read result at the temperature and is between two adjacent programmed states, or may also refer to an average value of read windows that are between all adjacent programmed states and determined according to a read result at the temperature, etc. In some examples, a size of the read window may also be referred to as a read window budget.

As shown in FIG. 6, when the program temperature of the memory device is less than the temperature threshold, the operation method of a memory device provided by the examples of the present disclosure comprises the following operation 601.

In operation 601, during a process of programming a selected memory cell coupled with a first selected word line, a first program voltage is applied to the first selected word line, a first pass voltage is applied to a first target word line, and a second pass voltage is applied to a second target word line; and the first selected word line is any one of a plurality of word lines of the memory device that is selected after a reference word line, the number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

In the examples of the present disclosure, the process of programming the selected memory cell coupled with the first selected word line is used as an example for description, wherein the first selected word line is any one of a plurality of word lines of the memory device that is selected after a reference word line.

The reference word line may be any word line except the last selected word line. The reference word line may be set according to experience, or may also be flexibly adjusted according to an actual application requirement, and the examples of the present disclosure are not limited thereto. After the reference word line is well set, the plurality of word lines of the memory device may be divided into two types; the first type word lines comprise word lines that are selected after the reference word line; and the second type word lines comprise word lines that are selected before the reference word line and the reference word line itself.

A sequence in which the first type word lines are selected is latter than a sequence in which the second type word lines are selected. For the selected word lines of which selected sequence is latter, since the selected memory cells coupled with many word lines have been programmed when the selected memory cells coupled with the selected word lines are programmed, the pass voltage that can be applied to the word lines coupled with the selected memory cells that have been programmed is limited (if the applied pass voltage is too large, threshold voltages (Vt) of the memory cells that have been programmed are changed due to an increase in a coupling effect between the word lines, such that from the statistics of the threshold voltages, the distribution of the threshold voltages is widened), e.g., the increasing of potential of the channels of the non-selected memory cells coupled with the selected word lines by applying the pass voltage is limited, such that the non-selected memory cells coupled with the selected word lines are more susceptible to program interference. That is to say, the latter the selected sequences are, the greater program interference the non-selected memory cells coupled with the word lines are subjected to. That is, the non-selected memory cells coupled with the first type word lines are subjected to greater program interference than the non-selected memory cells coupled with the second type word lines. Based on this, examples of the present disclosure provide an operation method that can effectively suppress the program interference to the non-selected memory cells coupled with the first type word lines, so as to reduce read errors by greatly lowering the program interference.

In an example, each word line in the memory device is coupled with a memory cell layer, e.g., all memory cells coupled with each word line constitute one memory cell layer. The sequence in which the word lines are selected refers to a sequence in which the memory cell layers coupled with the word lines are programmed. The sequence in which the memory cell layers coupled with the word lines are programmed refers to the ranking in which the memory cell layers coupled with the word lines are programmed among all the memory cell layers. The sequence in which the memory cell layers coupled with the word lines is related to a program direction. The program direction may be reverse or forward, wherein reverse programming refers to programming that is performed in sequence from a memory cell layer away from a substrate to a memory cell layer close to the substrate; and forward programming refers to programming that is performed in sequence from a memory cell layer close to the substrate to a memory cell layer away from the substrate. In some examples, in the case of reverse programming, if the memory cell layer coupled with the word line is close to the substrate, the word line may also be referred to as a bottom word line.

With different program directions, the word lines selected after the reference word line are different from the word lines selected before the reference word line. For example, when the program direction is reverse (e.g., reverse programming), the word lines selected after the reference word line refer to the word lines in which the coupled memory cell layers are closer to the substrate than the memory cell layer coupled with the reference word line; and when the program direction is forward (e.g., forward programming), the word lines selected after the reference word line refer to the word lines in which the coupled memory cell layers are farther away from the memory cell layer coupled with the reference word line.

Figure 7A:
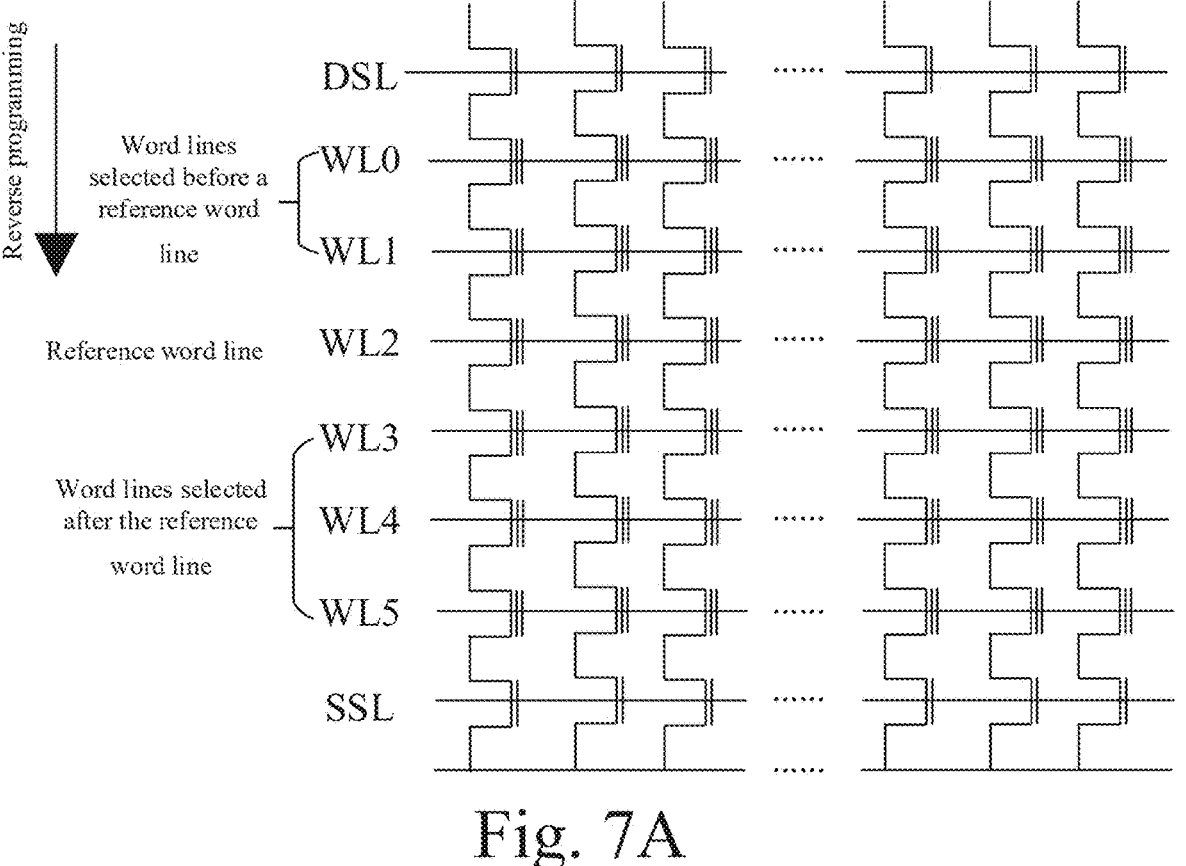
FIG. 7A is a schematic diagram of a reference word line, word lines selected after the reference word line, and word lines selected before the reference word line provided by examples of the present disclosure.
Figure 7B:
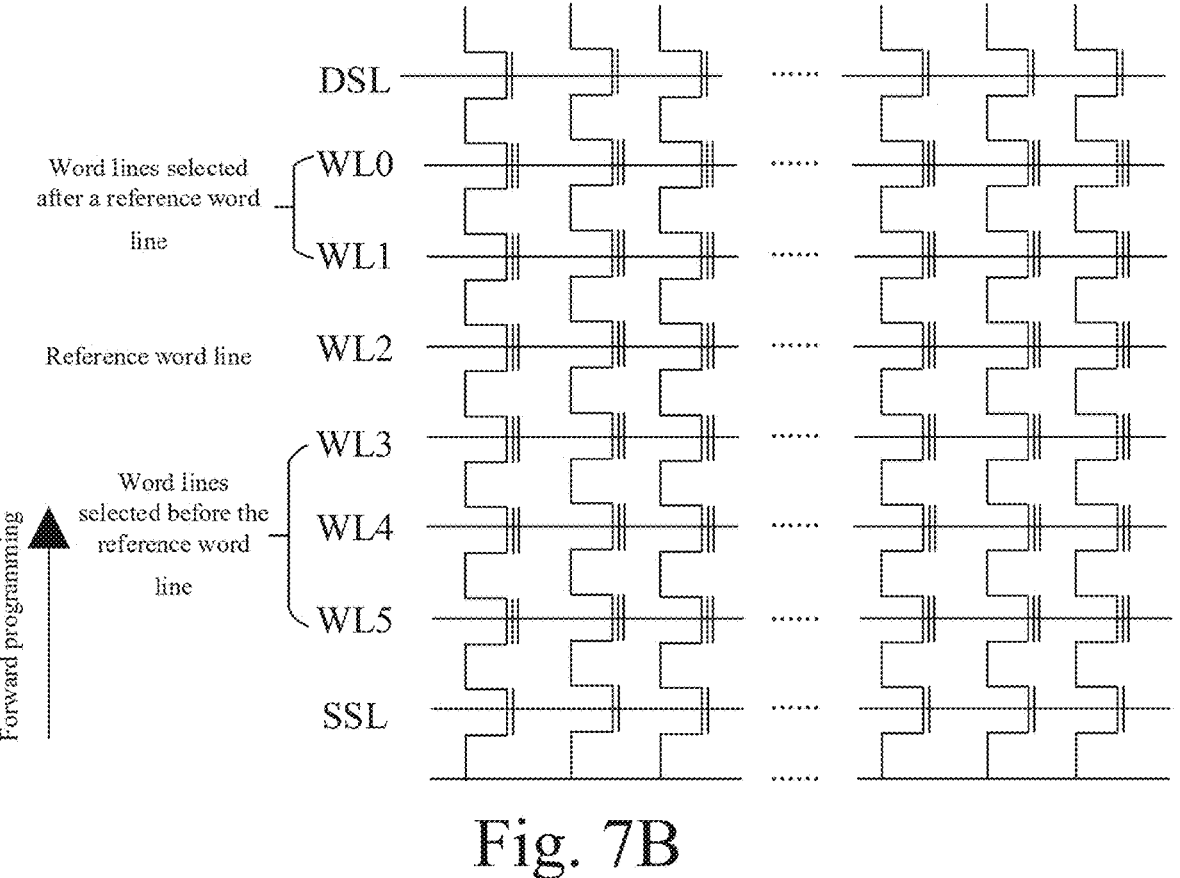
FIG. 7B is another schematic diagram of a reference word line, word lines selected after the reference word line, and word lines selected before the reference word line provided by examples of the present disclosure.

For example, assuming that the memory device includes the word lines WL0, WL1, WL2, WL3, WL4, and WL5, the memory cell layers coupled with the word lines WL0, WL1, WL2, WL3, WLA, and WL5 are arranged according to a sequence from away from the substrate (not shown in the figure) to close to the substrate, and the reference word line is the WL2, then in the case of reverse programming, referring to FIG. 7A, the word lines selected after the reference word line comprise the WL3, the WL4, and the WL5, and the word lines selected before the reference word line comprise the WL0 and the WL1; and in the case of forward programming, referring to FIG. 7B, the word lines selected after the reference word line comprise the WL0 and the WL1, and the word lines selected before the reference word line comprise the WL3, the WL4, and the WL5.

A principle of programming the selected memory cells coupled with each of the first type word lines is the same. In the examples of the present disclosure, the process of programming the selected memory cell coupled with any one (referred to as the first selected word line) of the first type word lines is used as an example for description.

During the process of programming the selected memory cell coupled with the first selected word line, the first program voltage is applied to the first selected word line. The first program voltage is used for writing data to the selected memory cell coupled with the first selected word line. In some examples, the first program voltage may be a fixed voltage. In some examples, the first program voltage may be a stepping voltage (e.g., a voltage increased step by step). A numerical value of the first program voltage may be flexibly adjusted according to a data volume of data that needs to be programmed in the selected memory cell, and the examples of the present disclosure are not limited thereto.

During the process of programming the selected memory cell coupled with the first selected word line, in addition to applying the first program voltage to the first selected word line, the first pass voltage is further applied to the first target word line, and the second pass voltage is applied to the second target word line. The first target word lines are word lines of which number of the word lines spaced apart from the first selected word line among all the word lines in the memory device is less than a number threshold, and the second target word lines are word lines among all the word lines in the memory device that are different from the first selected word line and the first target word line, that is, the second target word lines are the word lines among all the word lines in the memory device other than the first selected word line and the first target word line.

It is to be noted that, the first target word line and the second target word line are relative to the first selected word line, and when the first selected word line changes, the first target word line and the second target word line change accordingly.

The number threshold is a preset numerical value; and the number threshold is used for screening a small number of word lines spaced apart from the first selected word line from all the word lines in the memory device. In some examples, the small number of word lines spaced apart from the first selected word line may be referred to as the word lines adjacent to the first selected word line. That is to say, the number threshold is used for screening the word lines adjacent to the first selected word line from all the word lines in the memory device. The number threshold may be any integer greater than 0. The number threshold may be set according to experience, or may also be flexibly adjusted according to an application requirement. For example, the number threshold may be 1, 2, or the like.

It is to be noted that, the first target word lines may be all word lines of which number of the word lines spaced apart from the first selected word line is less than the number threshold, or may also be part of the word lines of which number of the word lines spaced apart from the first selected word line is less than the number threshold, and the examples of the present disclosure are not limited thereto.

In an example, when the first target word lines are all word lines of which number of the word lines spaced apart from the first selected word line is less than the number threshold, the first target word lines comprise first neighboring word lines and second neighboring word lines. The selected memory cells coupled with the first neighboring word lines have been programmed, and the selected memory cells coupled with the second neighboring word lines are not programmed. That is to say, the first neighboring word lines are word lines of which number of the word lines spaced apart from the first selected word line is less than the number threshold and that are selected before the first selected word line; and the second neighboring word lines are word lines of which number of the word lines spaced apart from the first selected word line is less than the number threshold and that are selected after the first selected word line. In an example, there may be one or more first neighboring word lines, there may be one or more second neighboring word lines, and the number of the first neighboring word lines is the same as the number of the second neighboring word lines.

Figure 8A:
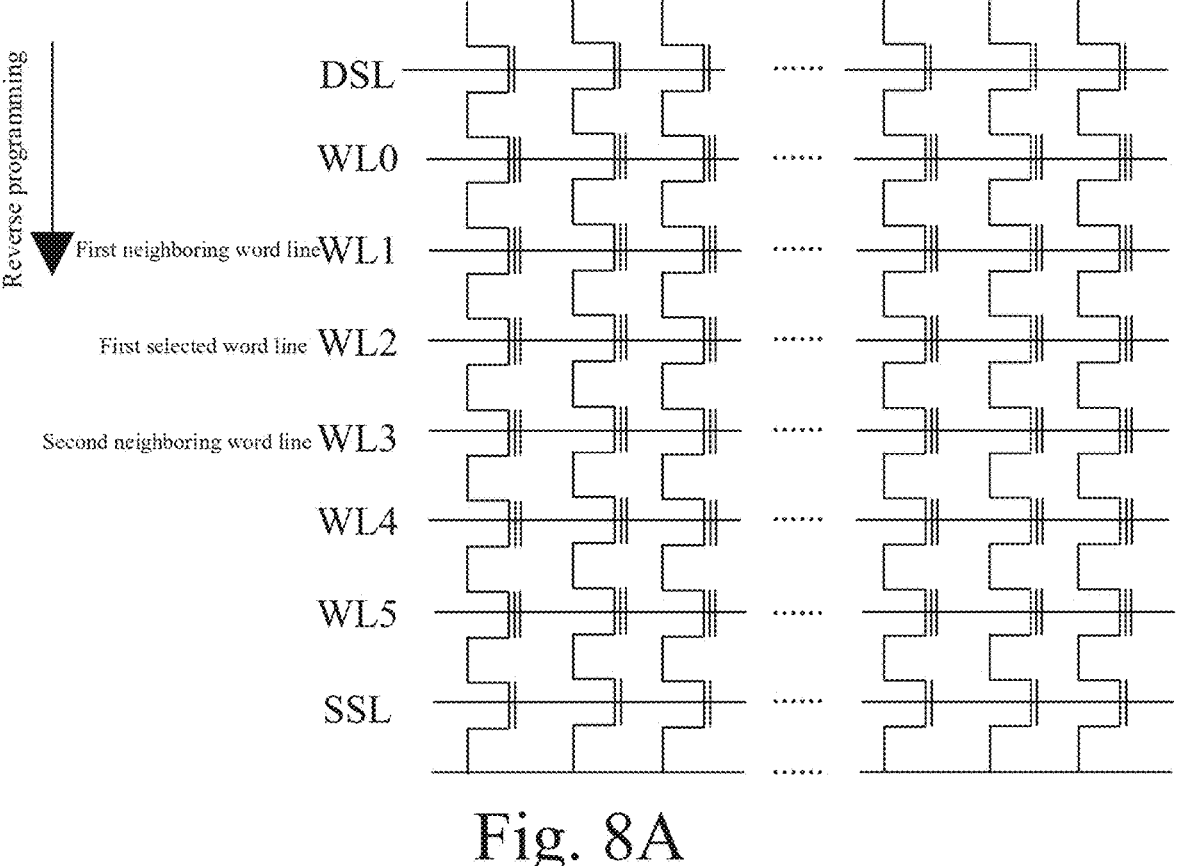
FIG. 8A is a schematic diagram of a first selected word line, a first neighboring word line, and a second neighboring word line provided by examples of the present disclosure.
Figure 8B:
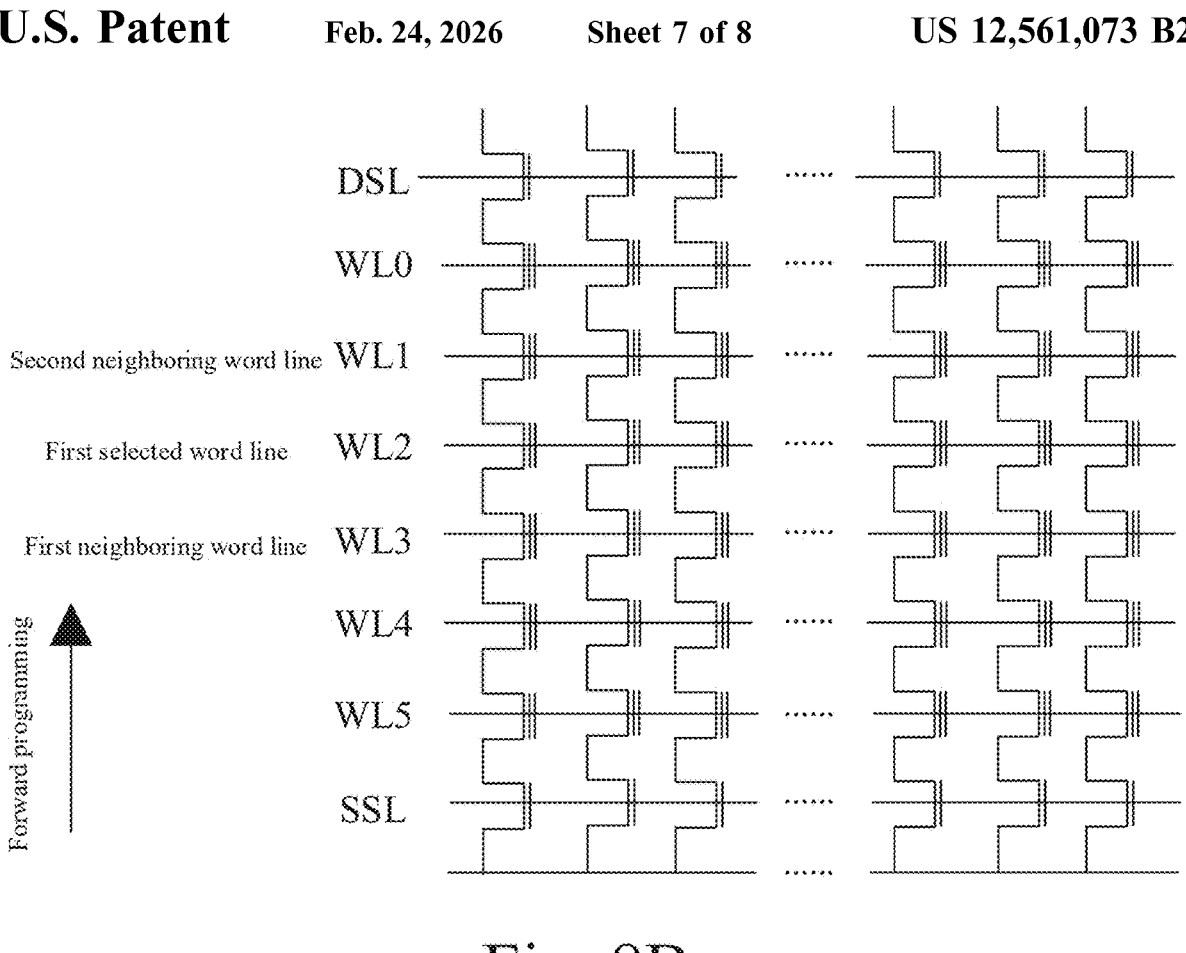
FIG. 8B is another schematic diagram of a first selected word line, a first neighboring word line, and a second neighboring word line provided by examples of the present disclosure.

For example, assuming that the memory device includes the word lines WL0, WL1, WL2, WL3, WL4, and WL5, the memory cell layers coupled with the word lines WL0, WL1, WL2, WL3, WL4, and WL5 are arranged according to a sequence from away from the substrate to close to the substrate, the number threshold is 1, the first selected word line is the WL2, then in the case of reverse programming, as shown in FIG. 8A, the first neighboring word line is the WL1, and the second neighboring word line is the WL3; and in the case of forward programming, as shown in FIG. 8B, the first neighboring word line is the WL3, and the second neighboring word line is the WL1.

When the first target word lines are a part of the word lines of which number of the word lines spaced apart from the first selected word line is less than the number threshold, the first target word lines only comprise the first neighboring word lines, or may also only comprise the second neighboring word lines. Of course, in some examples, there may be other cases for the first target word lines, and details are not described in the examples of the present disclosure.

For the first target word lines, during the process of programming the selected memory cell coupled with the first selected word line, the applied voltage is the first pass voltage. The first pass voltage is greater than a third pass voltage; the third pass voltage is a voltage that is utilized to turn on the channel of the memory cell coupled with the first target word line; and the third pass voltage is a voltage that is greater than a threshold voltage of the memory cell coupled with the first target word line. The third pass voltage may be considered as a pass voltage that is applied to the first target word line by default in one example. In the examples of the present disclosure, the first pass voltage that is applied to the first target word line is greater than the third pass voltage that is applied by default. That is, compared with one example, the pass voltage applied to the first target word line is increased in the examples of the present disclosure.

Since the number of the word lines spaced between the first target word line and the first selected word line is small, the potential of the channel of the non-selected memory cell coupled with the first selected word line can be directly increased by increasing the pass voltage applied to the first target word line, such that the possibility that the non-selected memory cell coupled with the first selected word line is incorrectly programmed at the first program voltage is suppressed through the high channel potential, e.g., the program interference to the non-selected memory cell coupled with the first selected word line is suppressed.

Since the program interference to the first selected word line is very severe at a relatively-low program temperature, the program interference can be greatly lowered by increasing the pass voltage applied to the first target word line, so as to greatly reduce the read errors. Based on this, even if the increase in the pass voltage applied to the first target word line may introduce a number of factors that increase the read errors (e.g., an increased word line coupling effect, increased pass voltage interference, etc.), an increased in the read errors caused by these factors can also be counteracted, such that the reduction of the read errors can be guaranteed. The increased word line coupling effect refers to an increase in the coupling effect between the first selected word line and the first neighboring word line, and the increased word line coupling effect may widen the distribution of the threshold voltages of the programmed memory cells coupled with the first neighboring word line, thereby increasing the read errors. The increased pass voltage interference refers to an increase in the interference of the pass voltage applied to the second neighboring word line to the non-selected memory cells coupled with the second neighboring word line, e.g., the pass voltage applied to the second neighboring word line increases the possibility that the non-selected memory cells coupled with the second neighboring word line are incorrectly programmed, thereby increasing the read errors.

It is to be noted that, there may be one or more first target word lines. When there are a plurality of first target word lines, each first target word line corresponds to one third pass voltage and one first pass voltage, and the first pass voltage corresponding to each first target word line is greater than the third pass voltage corresponding to each first target word line. The third pass voltages corresponding to different first target word lines may be the same or different; and the first pass voltages corresponding to different first target word lines may be the same or different.

The voltage difference values corresponding to different first target word lines may be the same or different. The voltage difference value corresponding to any target word line of the first target word lines refers to a difference value between the first pass voltage corresponding to any one of the target word lines and the third pass voltage corresponding to the target word line.

In example implementations, when the first target word line comprises the first neighboring word line and the second neighboring word line, the voltage difference value corresponding to the first neighboring word line is less than the voltage difference value corresponding to the second neighboring word line. The voltage difference value corresponding to the first neighboring word line is a difference value between the first pass voltage applied to the first neighboring word line and the third pass voltage that is utilized to turn on the channel of the memory cell coupled to the first neighboring word line, and the voltage difference value corresponding to the second neighboring word line is the difference value between the first pass voltage applied to the second neighboring word line and the third pass voltage that is utilized to turn on the channel of the memory cell coupled to the second neighboring word line. In an example, the first pass voltage applied to the first neighboring word line is the first pass voltage corresponding to the first neighboring word line; the third pass voltage that is utilized to turn on the channel of the memory cell coupled to the first neighboring word line is the third pass voltage corresponding to the first neighboring word line; the first pass voltage applied to the second neighboring word line is the first pass voltage corresponding to the second neighboring word line; and the third pass voltage that is utilized to turn on the channel of the memory cell coupled to the second neighboring word line is the third pass voltage corresponding to the second neighboring word line.

The selected memory cells coupled with the first neighboring word lines have been programmed, and the selected memory cells coupled with the second neighboring word lines are not programmed. By increasing even further the pass voltage of the second neighboring word line, the potential of the channel of the non-selected memory cell coupled with the first selected word line can be further increased on the basis of avoiding adverse effects on the memory cells that have been programmed, so as to further lower the program interference to the non-selected memory cell coupled with the first selected word line.

It is to be noted that, there may be one or more first neighboring word lines, and there may be one or more second neighboring word lines. When there are a plurality of first neighboring word lines and/or second neighboring word lines, the voltage difference value corresponding to the first neighboring word line being less than the voltage difference value corresponding to the second neighboring word line may mean that an average value of the voltage difference values corresponding to all the first neighboring word lines is less than an average value of the voltage difference values corresponding to all the second neighboring word lines, or may also mean that a maximum value in the voltage difference values corresponding to all the first neighboring word lines is less than a minimum value in the voltage difference values corresponding to all the second neighboring word lines, and the examples of the present disclosure are not limited thereto.

Of course, in some examples, the voltage difference value corresponding to the first neighboring word line may also be equal to the voltage difference value corresponding to the second neighboring word line, so as to perform a same degree of voltage compensation on the third pass voltages corresponding to the first neighboring word line and the second neighboring word line, thereby improving the convenience of voltage application.

In some examples, the number threshold being 1 and the first target word line comprising the first neighboring word line and the second neighboring word line are used as examples, the first selected word line may be represented as WLn, the first neighboring word line may be represented as WLn−1, the second neighboring word line may be represented as WLn+1, the third pass voltage corresponding to the first neighboring word line may be referred to as Vpass3, and the third pass voltage corresponding to the second neighboring word line may be referred to as Vpass4.

Figure 9:
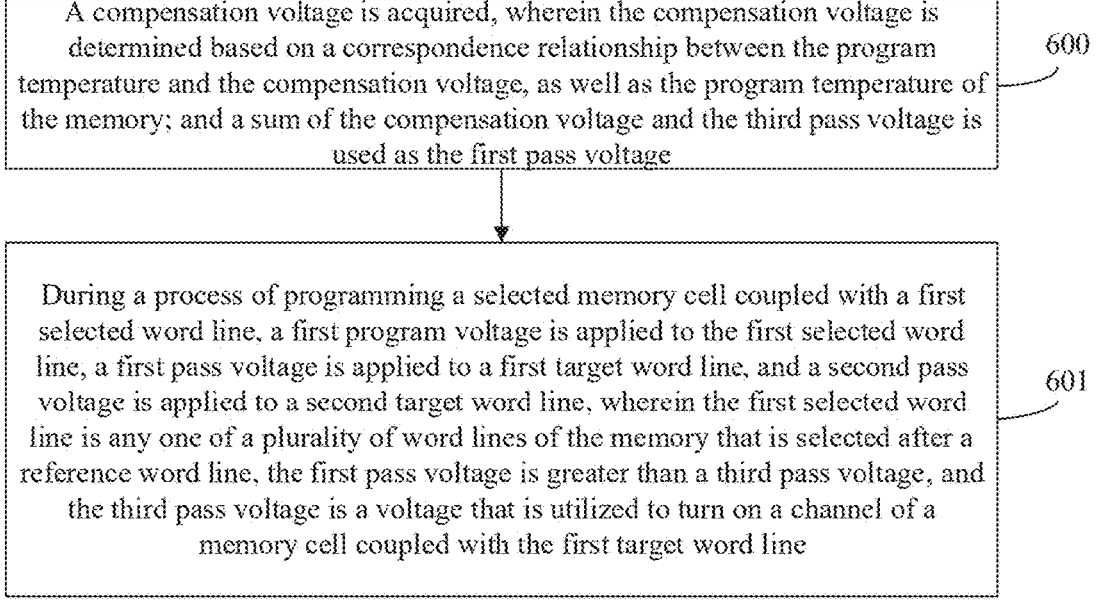
FIG. 9 is a flow diagram of another operation method of a memory device provided by examples of the present disclosure.

In an example implementation, referring to FIG. 9, the operation method of a memory device further comprises operation 600, so as to acquire the first pass voltage.

In operation 600, a compensation voltage is acquired, wherein the compensation voltage is determined based on a correspondence relationship between the program temperature and the compensation voltage, as well as the program temperature of the memory device; and a sum of the compensation voltage and the third pass voltage is used as the first pass voltage.

The compensation voltage is a voltage that is used for compensating the third pass voltage to obtain the first pass voltage. For example, the compensation voltage is the voltage that needs to be utilized to determine the first pass voltage on the basis of the third pass voltage. For ease of description, the compensation voltage acquired in operation 600 is referred to as the compensation voltage corresponding to the first target word line. The compensation voltage corresponding to the first target word line is determined based on the correspondence relationship between the program temperature and the compensation voltage, as well as the program temperature of the memory device. That is to say, the compensation voltage corresponding to the first target word line is the compensation voltage that corresponds to the program temperature of the memory device and is indicated in the correspondence relationship between the program temperature and the compensation voltage.

The correspondence relationship between the program temperature and the compensation voltage is a relationship based on which one unique compensation voltage can be determined according to the program temperature, and an expression form of the correspondence relationship between the program temperature and the compensation voltage is not limited in the examples of the present disclosure. In an example, the correspondence relationship between the program temperature and the compensation voltage may be expressed in the form of a formula. In the formula, an independent variable is the program temperature, a dependent variable is the compensation voltage, and except that the independent variable and the dependent variable are unknown, other parameters are all known parameters. In some examples, other parameters may be referred to as voltage compensation parameters (tco). In an example, the correspondence relationship between the program temperature and the compensation voltage may be expressed in the form of a Key-Value pair. In the Key-Value pair, Key represents the program temperature, and Value represents the compensation voltage.

When there are a plurality of first target word lines, each first target word line corresponds to one compensation voltage, and the first pass voltage corresponding to any first target word line of the first target word lines is the sum of the compensation voltage corresponding to the first target word line and the third pass voltage corresponding to the first target word line.

In some examples, the compensation voltages corresponding to different first target word lines may be determined based on the correspondence relationship between the same program temperature and the compensation voltages; and in this case, since the program temperature of the memory device is the same for different first target word lines, the compensation voltages corresponding to different first target word lines are the same. In some other examples, the compensation voltages corresponding to different first target word lines may be determined based on the correspondence relationship between different program temperatures and the compensation voltages; and in this case, the compensation voltages corresponding to different first target word lines may be the same or different.

The principle of acquiring the compensation voltages corresponding to different first target word lines is the same, and then the number of the first target word lines is used as an example to indicate an implementation of acquiring the compensation voltages corresponding to the first target word line.

In example implementations, the correspondence relationship between the program temperature and the compensation voltage may be stored in the memory device, for example, stored in a peripheral circuit in the memory device; and the correspondence relationship between the program temperature and the compensation voltage may also be stored in a controller that is configured to control the memory device. An implementation that the peripheral circuit acquires the compensation voltage corresponding to the first target word line is related to a storage position of the correspondence relationship between the program temperature and the compensation voltage.

In example implementations, when the correspondence relationship between the program temperature and the compensation voltage is stored in the memory device (e.g., a peripheral circuit in the memory device), e.g., the memory device (e.g., a peripheral circuit in the memory device) stores the correspondence relationship between the program temperature and the compensation voltage, the implementation that the peripheral circuit acquires the compensation voltage corresponding to the first target word line comprises: the peripheral circuit directly determining the compensation voltage based on the stored correspondence relationship between the program temperature and the compensation voltage, as well as the program temperature of the memory device. That is to say, the peripheral circuit directly determines, through the correspondence relationship, the compensation voltage corresponding to the program temperature of the memory device, and the compensation voltage is the acquired compensation voltage corresponding to the first target word line. This method facilitates the improvement of the efficiency of acquiring the compensation voltage corresponding to the first target word line.

In example implementations, when the correspondence relationship between the program temperature and the compensation voltage is stored in the controller, e.g., the controller stores the correspondence relationship between the program temperature and the compensation voltage, the implementation that the peripheral circuit acquires the compensation voltage corresponding to the first target word line may comprise: the controller sending the correspondence relationship between the program temperature and the compensation voltage to the peripheral circuit in the memory device; and the peripheral circuit receiving the correspondence relationship between the program temperature and the compensation voltage sent by the controller, and determining the compensation voltage corresponding to the first target word line based on the correspondence relationship and the program temperature of the memory device. That is to say, the peripheral circuit acquires the correspondence relationship between the program temperature and the compensation voltage through one information interaction with the controller, and then, in combination with the program temperature of the memory device, determines, according to the correspondence relationship, the compensation voltage corresponding to the first target word line. This method can save storage resources of the memory device, and can guarantee, only requiring one information interaction, the efficiency of acquiring the compensation voltage corresponding to the first target word line.

In example implementations, when the correspondence relationship between the program temperature and the compensation voltage is stored in the controller, e.g., the controller stores the correspondence relationship between the program temperature and the compensation voltage, the implementation that the peripheral circuit acquires the compensation voltage corresponding to the first target word line may further comprise: the peripheral circuit sending, to the controller, the program temperature of the memory device; the controller receiving the program temperature of the memory device, determining the compensation voltage corresponding to the first target word line based on the correspondence relationship between the program temperature and the compensation voltage, as well as the program temperature of the memory device, and sending, to the memory device, the compensation voltage corresponding to the first target word line; and the peripheral circuit receiving the compensation voltage corresponding to the first target word line sent by the controller. That is to say, the peripheral circuit acquires the compensation voltage corresponding to the first target word line through two information interactions with the controller, and a computing process of determining the compensation voltage corresponding to the first target word line is executed on the controller side, such that the storage resources and computing resources of the memory device are saved.

Regardless of the method that the peripheral circuit acquires the compensation voltage corresponding to the first target word line, after the compensation voltage corresponding to the first target word line is acquired, the peripheral circuit uses, as the first pass voltage, the sum of the compensation voltage corresponding to the first target word line and the third pass voltage. In an example, when there are a plurality of first target word lines, the peripheral circuit uses, as the first pass voltage corresponding to any first target word line of the first target word lines, the sum of the compensation voltage corresponding to the first target word line and the third pass voltage corresponding to the first target word line.

In some examples, the compensation voltage is negatively correlated with the program temperature of the memory device. That is to say, when the program temperature of the memory device is less than the temperature threshold, if the program temperature of the memory device is higher, the compensation voltage is smaller. For example, assuming that the temperature threshold is 25° C., and if the program temperature of the memory device is 20° C., the compensation voltage is 1 V, and if the program temperature of the memory device is −25° C., the compensation voltage is 3 V. It is to be noted that, the example here is intended only as an explanatory illustration of the negative correlation between the compensation voltage and the program temperature of the memory device, and does not represent actual conditions. Since the program temperature is lower, the program interference to the non-selected memory cell coupled with the first selected word line is greater, such that the pass voltage of the first target word line can be increased even further to further suppress the program interference.

When there are a plurality of first target word lines, and each first target word line corresponds to one compensation voltage, the compensation voltage corresponding to each first target word line is negatively correlated with the program temperature of the memory device.

In some examples, the compensation voltage is positively correlated with a sequence in which the first selected word line is selected. That is to say, the former the sequence in which the first selected word line is selected, the smaller the compensation voltage is. For example, referring to FIG. 7A, when the word lines selected after the reference word line comprise WL3, WL4, and WL5, if the first selected word line is the WL3, the compensation voltage is 1 V, and if the first selected word line is the WL5, the compensation voltage is 3 V. It is to be noted that, the example here is intended only as an explanatory illustration of the positive correlation between the compensation voltage and the sequence in which the first selected word line is selected, and does not represent actual conditions. Since the sequence in which the first selected word line is selected is latter, the program interference to the non-selected memory cell coupled with the first selected word line is greater, such that the pass voltage of the first target word line can be increased even further to further suppress the program interference.

When there are a plurality of first target word lines, and each first target word line corresponds to one compensation voltage, the compensation voltage corresponding to each first target word line is positively correlated with the sequence in which the first selected word line is selected.

It is to be noted that, the above-mentioned operation 600 only uses as an example for description that the compensation voltage corresponding to the first target word line is determined based on the correspondence relationship between the program temperature and the compensation voltage, as well as the program temperature of the memory device, and the examples of the present disclosure are not limited thereto. In some examples, the compensation voltage may also be a fixed numerical value. That is to say, when the program temperature of the memory device is less than the temperature threshold, regardless of the program temperature of the memory device, the same compensation voltage is utilized to compensate the first pass voltage, thereby simplifying processing logic.

Among the plurality of word lines of the memory device, in addition to comprising the first selected word line and the first target word line, a second target word line is further comprised, and during the process of programming the selected memory cell coupled with the first selected word line, a second pass voltage is applied to the second target word line.

In some examples, the second pass voltage is equal to a seventh pass voltage that is utilized to turn on a channel of the memory cell coupled with the second target word line, and the seventh pass voltage is greater than a threshold voltage of the memory cell coupled with the second target word line. In this case, only the pass voltage applied to the first target word line is increased, and the pass voltage applied to the second target word line is not increased, such that power resources are saved.

In some other examples, the second pass voltage is greater than the seventh pass voltage that is utilized to turn on the channel of the memory cell coupled with the second target word line. In this case, the potential of the channel of the non-selected memory cell coupled with the first selected word line is increased even further by increasing the pass voltage applied to the first target word line and the pass voltage applied to the second target word line, such that the program interference to the non-selected memory cell coupled with the first selected word line is suppressed even further.

When the second pass voltage is greater than the seventh pass voltage, a relationship between the voltage difference value corresponding to the first target word line and a voltage difference value corresponding to the second target word line is not limited in the examples of the present disclosure. The voltage difference value corresponding to the first target word line refers to a difference value between the first pass voltage and the third pass voltage; and the voltage difference value corresponding to the second target word line refers to a difference value between the second pass voltage and the seventh pass voltage.

In an example, when the second pass voltage is greater than the seventh pass voltage, the second pass voltage may be determined based on a principle same as the principle of determining the first pass voltage, for example, the compensation voltage corresponding to the second target word line is acquired, and the sum of the compensation voltage corresponding to the second target word line and the seventh pass voltage is used as the second pass voltage corresponding to the second target word line.

The compensation voltage corresponding to the second target word line may be a fixed voltage, or may also be a voltage that is determined based on the correspondence relationship between the program temperature and the compensation voltage, as well as the program temperature of the memory device. When the compensation voltage corresponding to the second target word line is the voltage that is determined based on the correspondence relationship between the program temperature and the compensation voltage, as well as the program temperature of the memory device, the correspondence relationship between the program temperature and the compensation voltage on which the determination of the compensation voltage corresponding to the second target word line is based may be the same as or different from the correspondence relationship between the program temperature and the compensation voltage on which the determination of the compensation voltage corresponding to the first target word line is based.

The relationship between the third pass voltage corresponding to the first target word line and the seventh pass voltage corresponding to the second target word line is not limited in the examples of the present disclosure, and is related to the relationship between the threshold voltages of the memory cells respectively coupled with the first target word line and the second target word line.

It is to be noted that, there is one or more second target word lines; and when there are a plurality of second target word lines, each second target word line corresponds to one second pass voltage, and the second pass voltages corresponding to different second target word lines may be the same or different.

It is to be noted that, the existence of the second target word line is only for the purpose of description in the examples of the present disclosure. In some examples, through the proper setting of the number threshold, the second target word line may not exist.

In some examples, the operation method of a memory device further comprises: during a process of programming a selected memory cell coupled with a second selected word line, applying a second program voltage to the second selected word line, applying a fourth pass voltage to a third target word line, and applying a fifth pass voltage to a fourth target word line. The second selected word line is any one of the reference word line and a word line among the plurality of word lines that is selected before the reference word line. That is to say, the second selected word line is any one of the second type word lines.

The second program voltage is a program voltage that needs to be applied during the process of programming the selected memory cell coupled with the second selected word line. The relationship between the first program voltage and the second program voltage is not limited in the examples of the present disclosure, and is related to data needed to be programmed by the selected memory cell coupled with the first selected word line and data needed to be programmed by the selected memory cell coupled with the second selected word line.

During the process of programming the selected memory cell coupled with the second selected word line, other word lines other than the second selected word line may be divided into third target word lines and fourth target word lines, wherein the number of the word lines spaced between the third target word lines and the fourth target word lines is less than the number threshold, and the fourth target word lines are different from the second selected word line and the third target word lines, that is to say, the fourth target word lines are other word lines other than the second selected word line and the third target word lines. It is to be noted that, the existence of the fourth target word line is only for the purpose of description in the examples of the present disclosure, and the examples of the present disclosure are not limited thereto. In some examples, through the proper setting of the number threshold, the fourth target word line may not exist.

During the process of programming the selected memory cell coupled with the second selected word line, a fourth pass voltage is applied to the third target word line. In an example, the fourth pass voltage is not less than (e.g., equal to or greater than) a sixth pass voltage. The sixth pass voltage is the voltage that is utilized to turn on the channel of the memory cell coupled with the third target word line. For example, the pass voltage applied to the third target word line may be maintained to be unchanged at the default sixth pass voltage, or may also be increased.

In an example, a difference value between the fourth pass voltage and the sixth pass voltage is less than a difference value between the first pass voltage and the third pass voltage. The difference value between the fourth pass voltage and the sixth pass voltage may be understood as an increase magnitude of the pass voltage applied to the third target word line, and the difference value between the first pass voltage and the third pass voltage may be understood as an increase magnitude of the pass voltage applied to the first target word line. That is to say, even if the pass voltage applied to the third target word line is increased, the increase magnitude of the pass voltage applied to the third target word line is less than the increase magnitude of the pass voltage applied to the first target word line. This is because the third target word line is a neighboring word line of the second selected word line, the first target word line is a neighboring word line of the first selected word line, a sequence in which the second selected word line is selected is prior to that of the first selected word line, that is, the program interference to the non-selected memory cell coupled with the second selected word line is less than the program interference to the non-selected memory cell coupled with the first selected word line, and when the program interference is relatively small, the read errors that are reduced due to the lowered program interference from the increased pass voltage applied to the neighboring word line cannot counteract the read errors that are increased due to the increased coupling effect, increased pass voltage interference, etc., such that the read errors are guaranteed to be not increased without increasing the pass voltage of the neighboring word line (e.g., the third target word line) of the second selected word line or by increasing the pass voltage of the neighboring word line (e.g., the third target word line) of the second selected word line to a small extent.

In an example, when the fourth pass voltage is greater than the sixth pass voltage, the fourth pass voltage may be determined based on a principle same as the principle to determine the first pass voltage, as long as it is ensured that the difference value between the fourth pass voltage and the sixth pass voltage is less than the difference value between the first pass voltage and the third pass voltage.

In an example, when there are a plurality of first target word lines and/or third target word lines, the difference value between the fourth pass voltage and the sixth pass voltage being less than the difference value between the first pass voltage and the third pass voltage may mean that an average value of the difference values between the fourth pass voltage and the sixth pass voltage corresponding to all the third target word lines is less than an average value of the difference values between the first pass voltage and the third pass voltage corresponding to all the first target word lines, or may also mean that the maximum value in the difference values between the fourth pass voltage and the sixth pass voltage corresponding to all the third target word lines is less than the minimum value in the difference values between the first pass voltage and the third pass voltage corresponding to all the first target word lines, etc., and the examples of the present disclosure are not limited thereto.

During the process of programming the selected memory cell coupled with the second selected word line, a fifth pass voltage is applied to the fourth target word line, and the fifth pass voltage is equal to or greater than an eighth pass voltage that is utilized to turn on a channel of the memory cell coupled with the fourth target word line. When the fifth pass voltage is greater than the eighth pass voltage, the fifth pass voltage may be determined based on a principle same as the principle to determine the first pass voltage.

It is to be noted that, the first target word line and the second target word line are the word lines that are determined during the process of programming the selected memory cell coupled with the first selected word line; and the third target word line and the fourth target word line are the word lines that are determined during the process of programming the selected memory cell coupled with the second selected word line. The first target word line may overlap with at least one of the third target word line or the fourth target word line; and the second target word line may overlap with at least one of the third target word line or the fourth target word line.

The operation method provided by the examples of the present disclosure may be regarded as an operation method for suppressing low-temperature program interference through low-temperature voltage compensation. In the examples of the present disclosure, the pass voltages at a low temperature of the neighboring word lines of the word lines (e.g., the word lines selected after the reference word line)

of which selected sequence is latter can be independently compensated, such that the performance of the word lines of which selected sequence is latter can be improved without affecting the word lines of which selected sequence is former, circuit areas is not increased in hardware implementations, and a read window budget can be effectively increased, thereby reducing read errors. In the method provided by the examples of the present disclosure, temperature compensation parameters (tco) respectively corresponding to the word lines of which selected sequence is latter and the word lines of which selected sequence is former are split at a chip testing phase, so as to respectively control the pass voltages of the respective neighboring word lines for the word lines of which selected sequence is latter and the word lines of which selected sequence is former, such that the program performance of the memory device is optimized, and if a new generation of product development and design is added, the cost of photomasks and manufacturing cannot be increased.

In the technical solutions provided by the examples of the present disclosure, when the program temperature is relatively low, during the process of programming the selected memory cell coupled with the first selected word line (e.g., selected after the reference word line) of which selected sequence is latter, the pass voltage applied to the first target word line close to the first selected word line is increased. The potential of the channel of the non-selected memory cell coupled with the first selected word line can be increased by increasing the pass voltage applied to the first target word line, such that the program interference to the non-selected memory cell is lowered. Since the program temperature is relatively low, the program interference to the non-selected memory cell coupled with the first selected word line of which selected sequence is latter is very severe, such that the program interference can be greatly lowered by increasing the pass voltage applied to the first target word line, so as to greatly reduce the read errors. Based on this, even if the increase in the pass voltage applied to the first target word line may introduce some factors that increase the read errors (e.g., an increased word line coupling effect, increased pass voltage interference, etc.), an increased in the read errors caused by these factors can also be counteracted, such that the reduction of the read errors can be guaranteed.

Examples of the present disclosure provide a memory device. The memory device comprises:

a memory array comprising a plurality of memory cells;

a plurality of word lines coupled with the plurality of memory cells; and a peripheral circuit, coupled with the plurality of word lines, wherein the peripheral circuit is configured to execute the following operations when a program temperature of the memory device is less than a temperature threshold:

during a process of programming a selected memory cell coupled with a first selected word line, applying a first program voltage to the first selected word line, applying a first pass voltage to a first target word line, and applying a second pass voltage to a second target word line, wherein the first selected word line is any one of a plurality of word lines of the memory device that is selected after a reference word line, the number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

In example implementations, the memory device further comprises a temperature sensor. The peripheral circuit is configured to measure, by the temperature sensor, the program temperature of the memory device.

In example implementations, the peripheral circuit is further configured to:

acquire a compensation voltage, wherein the compensation voltage is determined based on a correspondence relationship between the program temperature and the compensation voltage, as well as the program temperature of the memory device; and use a sum of the compensation voltage and the third pass voltage as the first pass voltage.

In example implementations, the compensation voltage is negatively correlated with the program temperature of the memory device.

In example implementations, the compensation voltage is positively correlated with a sequence in which the first selected word line is selected in a program direction.

In example implementations, the first target word line comprises a first neighboring word line and a second neighboring word line, and a voltage difference value corresponding to the first neighboring word line is less than a voltage difference value corresponding to the second neighboring word line;

the voltage difference value corresponding to the first neighboring word line is a difference value between a first pass voltage applied to the first neighboring word line and a third pass voltage that is utilized to turn on a channel of a memory cell coupled to the first neighboring word line, and the voltage difference value corresponding to the second neighboring word line is a difference value between a first pass voltage applied to the second neighboring word line and a third pass voltage that is utilized to turn on a channel of a memory cell coupled to the second neighboring word line; and a selected memory cell coupled with the first neighboring word line has been programmed, and a selected memory cell coupled with the second neighboring word line is not programmed.

In example implementations, the peripheral circuit is further configured to:

during a process of programming a selected memory cell coupled with a second selected word line, apply a second program voltage to the second selected word line, apply a fourth pass voltage to a third target word line, and apply a fifth pass voltage to a fourth target word line, wherein the second selected word line is any one of the reference word line and a word line among the plurality of word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled to the third target word line, and a difference value between the fourth pass voltage and the sixth pass voltage is less than a difference value between the first pass voltage and the third pass voltage.

The descriptions about the memory-related hardware examples have beneficial effects similar to those of the method examples. Technical details undisclosed in the memory-related hardware examples are understood with reference to the descriptions about the method examples of the present disclosure. In an example, the memory device may be the memory device shown in FIG. 4.

Figure 10:
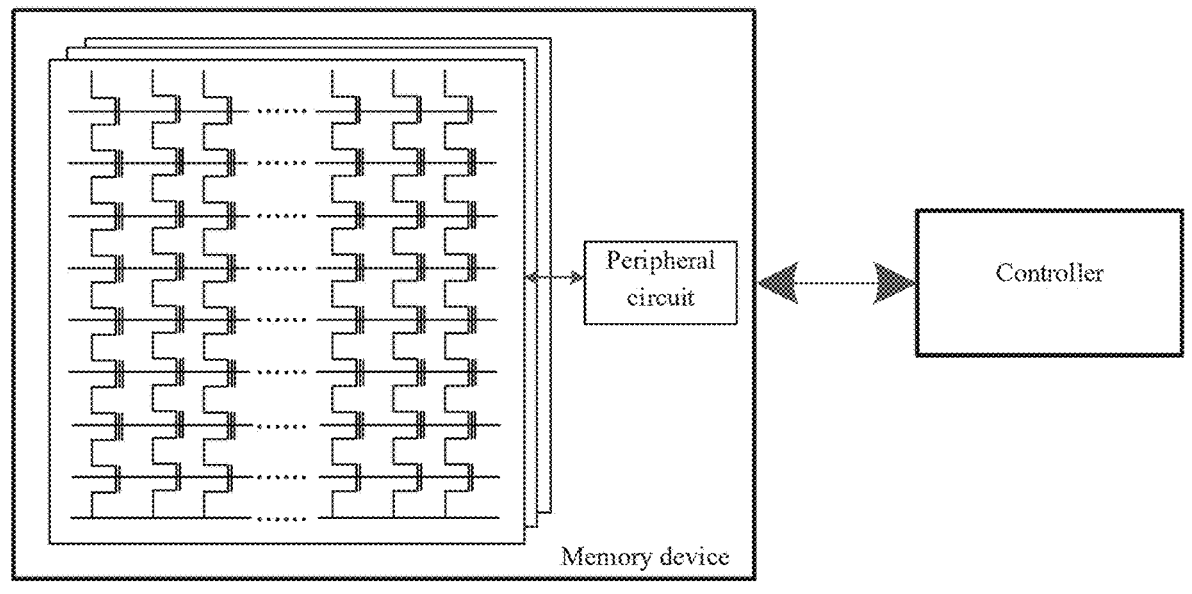
FIG. 10 is a schematic structural diagram of a memory system provided by examples of the present disclosure.

Examples of the present disclosure provide a memory system. As shown in FIG. 10, the memory system comprises a memory device and a controller coupled with the memory device. The controller is configured to control the memory device. In an example, the memory system may be the memory system 102 shown in FIG. 1.

The memory device is configured to execute the following operations when a program temperature of the memory device is less than a temperature threshold:

during a process of programming a selected memory cell coupled with a first selected word line, applying a first program voltage to the first selected word line, applying a first pass voltage to a first target word line, and applying a second pass voltage to a second target word line, wherein the first selected word line is any one of a plurality of word lines of the memory device that is selected after a reference word line, the number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

In example implementations, the memory device is further configured to:

acquire a compensation voltage, wherein the compensation voltage is determined based on a correspondence relationship between the program temperature and the compensation voltage, as well as the program temperature of the memory device; and use a sum of the compensation voltage and the third pass voltage as the first pass voltage.

In example implementations, the controller stores the correspondence relationship between the program temperature and the compensation voltage;

the controller is configured to send the correspondence relationship to the memory device; and the memory device is configured to receive the correspondence relationship, and determine the compensation voltage based on the correspondence relationship, and the program temperature of the memory device.

In example implementations, the controller stores the correspondence relationship between the program temperature and the compensation voltage;

the memory device is configured to send, to the controller, the program temperature of the memory device;

the controller is configured to receive the program temperature of the memory device, determine the compensation voltage based on the correspondence relationship, and the program temperature of the memory device, and send the compensation voltage to the memory device; and the memory device is further configured to receive the compensation voltage.

In example implementations, the memory device stores the correspondence relationship between the program temperature and the compensation voltage;

the memory device is configured to determine the compensation voltage based on the correspondence relationship, and the program temperature of the memory device.

In example implementations, the compensation voltage is negatively correlated with the program temperature of the memory device.

In example implementations, the compensation voltage is positively correlated with a sequence in which the first selected word line is selected.

In example implementations, the memory device further comprises a temperature sensor. The memory device is configured to measure, by the temperature sensor, the program temperature of the memory device.

In example implementations, the memory device is further configured to:

during a process of programming a selected memory cell coupled with a second selected word line, apply a second program voltage to the second selected word line, apply a fourth pass voltage to a third target word line, and apply a fifth pass voltage to a fourth target word line, wherein the second selected word line is any one of the reference word line and a word line among the plurality of word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled to the third target word line, and a difference value between the fourth pass voltage and the sixth pass voltage is less than a difference value between the first pass voltage and the third pass voltage.

It is to be noted that, "the memory device being configured to" in the descriptions of the above-mentioned examples may be understood as "a peripheral circuit in the memory device being configured to".

The descriptions about the memory system-related hardware examples have beneficial effects similar to those of the method examples. Technical details undisclosed in the memory system-related hardware examples are understood with reference to the descriptions about the method examples of the present disclosure.

Examples of the present disclosure provide an electronic system. The electronic system comprises a host and any one of the memory systems described above, wherein the memory system is coupled with the host. In an example, the electronic system may be shown in FIG. 1.

It should be understood that, "a plurality of" mentioned here refers to two or more. The term "and/or" is an association relationship describing related objects, which means that there may be three relationships, for example, A and/or B may indicate three cases: A exists alone, both A and B exist, and B exists alone. The character "/" generally indicates that the related objects are in an "or" relationship.

The above are only example implementations of the present disclosure, and are not used to limit the present disclosure. Any modifications, equivalent replacements and improvements and the like made within the principle of the disclosure shall be included within the scope of protection of the present disclosure.

29

30

What is claimed is:

1. An operation method of a memory device, wherein a program temperature of the memory device is less than a temperature threshold, and the method comprises:

during a process of programming a selected memory cell coupled with a first selected word line, applying a first program voltage to the first selected word line, applying a first pass voltage to a first target word line, and applying a second pass voltage to a second target word line, wherein the first selected word line is any one of word lines of the memory device that is selected after a reference word line, a number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

2. The method of claim 1, further comprising:

acquiring a compensation voltage, wherein the compensation voltage is determined based on a correspondence relationship between the program temperature and the compensation voltage, as well as the program temperature of the memory device; and using a sum of the compensation voltage and the third pass voltage as the first pass voltage.

3. The method of claim 2, wherein the compensation voltage is negatively correlated with the program temperature of the memory device.

4. The method of claim 2, wherein the compensation voltage is positively correlated with a sequence in which the first selected word line is selected.

5. The method of claim 1, wherein the first target word line comprises a first neighboring word line and a second neighboring word line, and a voltage difference value corresponding to the first neighboring word line is less than a voltage difference value corresponding to the second neighboring word line;

the voltage difference value corresponding to the first neighboring word line is a difference value between a first pass voltage applied to the first neighboring word line and a third pass voltage that is utilized to turn on a channel of a memory cell coupled with the first neighboring word line, and the voltage difference value corresponding to the second neighboring word line is a difference value between a first pass voltage applied to the second neighboring word line and a third pass voltage that is utilized to turn on a channel of a memory cell coupled with the second neighboring word line; and a selected memory cell coupled with the first neighboring word line has been programmed, and a selected memory cell coupled with the second neighboring word line is not programmed.

6. The method of claim 1, further comprising:

during a process of programming a selected memory cell coupled with a second selected word line, applying a second program voltage to the second selected word line, applying a fourth pass voltage to a third target word line, and applying a fifth pass voltage to a fourth target word line, wherein the second selected word line is any one of the reference word line and a word line among the word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled with the third target word line, and a difference value between the fourth pass voltage and the sixth pass voltage is less than a difference value between the first pass voltage and the third pass voltage.

7. The method of claim 1, wherein the program temperature of the memory device being less than the temperature threshold comprises: during the process of programming the memory device, a temperature measured by a temperature sensor in the memory device is less than the temperature threshold.

8. A memory device, comprising:

a memory array comprising memory cells;

word lines coupled with the memory cells; and a peripheral circuit, coupled with the word lines, wherein the peripheral circuit is configured to:

responsive to a program temperature of the memory device being than a temperature threshold and during a process of programming a selected memory cell coupled with a first selected word line:

applying a first program voltage to the first selected word line;

applying a first pass voltage to a first target word line; and applying a second pass voltage to a second target word line, wherein the first selected word line is any one of word lines of the memory device that is selected after a reference word line, a number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

9. The memory device of claim 8, further comprising a temperature sensor, wherein the peripheral circuit is configured to measure, by the temperature sensor, the program temperature of the memory device.

10. The memory device of claim 8, wherein the peripheral circuit is further configured to:

acquire a compensation voltage, wherein the compensation voltage is determined based on a correspondence relationship between the program temperature and the compensation voltage, as well as the program temperature of the memory device; and use a sum of the compensation voltage and the third pass voltage as the first pass voltage.

11. The memory device of claim 10, wherein the compensation voltage is negatively correlated with the program temperature of the memory device.

12. The memory device of claim 10, wherein the compensation voltage is positively correlated with a sequence in which the first selected word line is selected in a program direction.

13. The memory device of claim 8, wherein the first target word line comprises a first neighboring word line and a second neighboring word line, and a voltage difference value corresponding to the first neighboring word line is less than a voltage difference value corresponding to the second neighboring word line;

the voltage difference value corresponding to the first neighboring word line is a difference value between a first pass voltage applied to the first neighboring word line and a third pass voltage that is utilized to turn on a channel of a memory cell coupled with the first neighboring word line, and the voltage difference value corresponding to the second neighboring word line is a difference value between a first pass voltage applied to the second neighboring word line and a third pass voltage that is utilized to turn on a channel of a memory cell coupled with the second neighboring word line; and a selected memory cell coupled with the first neighboring word line has been programmed, and a selected memory cell coupled with the second neighboring word line is not programmed.

14. The memory device of claim 8, wherein the peripheral circuit is further configured to:

during a process of programming a selected memory cell coupled with a second selected word line, apply a second program voltage to the second selected word line, apply a fourth pass voltage to a third target word line, and apply a fifth pass voltage to a fourth target word line, wherein the second selected word line is any one of the reference word line and a word line among the word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled with the third target word line, and a difference value between the fourth pass voltage and the sixth pass voltage is less than a difference value between the first pass voltage and the third pass voltage.

15. A memory system, comprising a memory device and a controller coupled with the memory device, wherein the controller is configured to control the memory device; and the memory device is configured to perform the following operations when a program temperature of the memory device is less than a temperature threshold:

during a process of programming a selected memory cell coupled with a first selected word line, applying a first program voltage to the first selected word line, applying a first pass voltage to a first target word line, and applying a second pass voltage to a second target word line, wherein the first selected word line is any one of word lines of the memory device that is selected after a reference word line, a number of the word lines spaced between the first target word line and the first selected word line is less than a number threshold, the second target word line is different from the first selected word line and the first target word line, the first pass voltage is greater than a third pass voltage, and the third pass voltage is a voltage that is utilized to turn on a channel of a memory cell coupled with the first target word line.

16. The memory system of claim 15, wherein the memory device is further configured to:

acquire a compensation voltage, wherein the compensation voltage is determined based on a correspondence relationship between the program temperature and the compensation voltage, as well as the program temperature of the memory device; and use a sum of the compensation voltage and the third pass voltage as the first pass voltage.

17. The memory system of claim 16, wherein the controller stores the correspondence relationship between the program temperature and the compensation voltage;

the controller is configured to send the correspondence relationship to the memory device; and the memory device is configured to receive the correspondence relationship, and determine the compensation voltage based on the correspondence relationship, and the program temperature of the memory device.

18. The memory system of claim 16, wherein the controller stores the correspondence relationship between the program temperature and the compensation voltage;

the memory device is configured to send, to the controller, the program temperature of the memory device;

the controller is configured to receive the program temperature of the memory device, determine the compensation voltage based on the correspondence relationship and the program temperature of the memory device, and send the compensation voltage to the memory device; and the memory device is further configured to receive the compensation voltage.

19. The memory system of claim 16, wherein the memory device stores the correspondence relationship between the program temperature and the compensation voltage; and the memory device is configured to determine the compensation voltage based on the correspondence relationship, and the program temperature of the memory device.

20. The memory system of claim 15, wherein the memory device is further configured to:

during a process of programming a selected memory cell coupled with a second selected word line, apply a second program voltage to the second selected word line, apply a fourth pass voltage to a third target word line, and apply a fifth pass voltage to a fourth target word line, wherein the second selected word line is any one of the reference word line and a word line among the word lines that is selected before the reference word line, the number of the word lines spaced between the third target word line and the second selected word line is less than the number threshold, the fourth target word line is different from the second selected word line and the third target word line, the fourth pass voltage is not less than a sixth pass voltage, the sixth pass voltage is a voltage that is utilized to turn on a channel of a memory cell coupled with the third target word line, and a difference value between the fourth pass voltage and the sixth pass voltage is less than a difference value between the first pass voltage and the third pass voltage.

* * * * *